(12) United States Patent
Han (10) Patent No.: US 9,870,030 B2
(45) Date of Patent: Jan. 16, 2018

(54) DETACHABLE KEYBOARD STRUCTURE

(71) Applicant: EVGA CORPORATION, New Taipei (TW)

(72) Inventor: Tai-Sheng Han, New Taipei (TW)

(73) Assignee: EVGA CORPORATION, New Taipei City (TW)

( * ) Notice: Subject to any disclaimer, the term of this patent is extended or adjusted under 35 U.S.C. 154(b) by 0 days.

(21) Appl. No.: 15/151,468

(22) Filed: May 10, 2016

(65) Prior Publication Data

US 2017/0329370 A1　Nov. 16, 2017

(51) Int. Cl.
　　*G06F 1/16*　　(2006.01)
　　*H05K 5/00*　　(2006.01)
　　*H05K 7/00*　　(2006.01)

(52) U.S. Cl.
　　CPC ................. *G06F 1/1669* (2013.01)

(58) Field of Classification Search
　　CPC .... G06F 1/1669; G06F 1/1624; G06F 1/1662; G06F 1/1664; G06F 1/1666; G06F 1/1667
　　USPC ............ 361/679.15, 679.16, 679.19, 679.08, 361/679.09, 679.17, 679.11
　　See application file for complete search history.

(56) References Cited

U.S. PATENT DOCUMENTS

| | | | | |
|---|---|---|---|---|
| 6,700,774 B2* | 3/2004 | Chien | ................... | G06F 1/1616 361/679.2 |
| 8,913,376 B2* | 12/2014 | Wu | ........................ | G06F 1/1626 248/917 |
| 2004/0056843 A1* | 3/2004 | Lin | ........................ | G06F 1/1616 345/168 |
| 2011/0317354 A1* | 12/2011 | Hung | ................... | G06F 1/1626 361/679.09 |
| 2012/0218699 A1* | 8/2012 | Leung | ................... | G06F 1/1616 361/679.08 |
| 2012/0287562 A1* | 11/2012 | Wu | ........................ | G06F 1/1626 361/679.01 |

\* cited by examiner

*Primary Examiner* — Anthony Haughton
(74) *Attorney, Agent, or Firm* — Leong C. Lei (57) ABSTRACT

A detachable keyboard structure includes a keyboard assembly selectively mounted to a notebook computer, a movable cover movably mounted to one side of the keyboard assembly, at least one flexible bendable section connecting the keyboard assembly and the movable cover to each other, and a positioning member rotatably mounted to one side of the movable cover that is distant from the flexible bendable section to fix the movable cover to one side of the keyboard assembly. With such a structure, a user is provided, on a detachable keyboard assembly of a notebook computer, with a movable cover that offers functions of protection and is fixable by a positioning member to prevent undesired detachment during movement of the keyboard assembly. In addition, in use, the movable cover may be folded in a reversed direction through the flexible bendable section to serve as a wrist support for the keyboard assembly.

7 Claims, 9 Drawing Sheets

DETACHABLE KEYBOARD STRUCTURE

(a) TECHNICAL FIELD OF THE INVENTION

The present invention relates generally to a detachable keyboard structure, and more particularly to a detachable keyboard structure that provides a protection cover and a wrist protector pad to a notebook computer keyboard with a simple arrangement.

(b) DESCRIPTION OF THE PRIOR ART

Technology and information have been increasingly advanced and developed. Computer devices and peripherals thereof have been widely used. Taking a notebook computer as an example, a keyboard is widely used as an interface of operation for the notebook computer and becomes an indispensable hardware peripheral device. A conventional notebook computer usually comprises a keyboard that is unitarily formed with the computer itself. However, to some extents, the keyboard may be considered consumables, which require cleaning, maintenance, or even replacement after use for a long while or being accidently stained. Thus, there is an increasing demand for a detachable keyboard for the notebook computers.

Further, due to being constrained by the small size of a notebook computer, the conventional detachable keyboard may not be operated by a user in an ergonomic manner. The wrists of the user may readily get hurt for long term uses of the computer. Thus, the number of users is increasing in using a wrist protection board in operating a keyboard in order to protect the wrists against undesired hurting. However, since the keyboard and the wrist protection board are individual and separate parts, when not in use, the wrist protection board occupies quite an amount of space, and when in use, it must be first assembled with the keyboard, leading to inconvenience of use. Thus, although the wrist protection board helps protect the wrists of the user, the use of the wrist protection boards is not prevailing.

Thus, there are still issues for further improvement of the conventional keyboards of notebook computers, which will be briefed as follows:

(1) Although a detachable keyboard usable with a notebook computer is commonly known, heretofore, the notebook computer keyboard does not offer a function of protection.

(2) Typing with a notebook computer may readily hurt the wrists; however, the use of a conventional wrist protection board is inconvenient.

SUMMARY OF THE INVENTION

In view of the above problems and drawbacks, the present invention aims to provide a detachable keyboard structure that provides a protection cover and a wrist protector pad to a notebook computer keyboard with a simple arrangement.

The primary object of the present invention is thus to provide a detachable keyboard of a notebook computer with functions of dust protection and wrist protection, but not affecting the convenience of use of the keyboard.

To achieve the above object, the present invention provides a structure that comprises: a keyboard assembly that is selectively mounted to a notebook computer. A movable cover is movably mounted to one side of the keyboard assembly. A least one flexible bendable section connects the keyboard assembly and the movable cover to each other. A positioning member is rotatably mounted to one side of the movable cover that is distant from the flexible bendable section for fixing the movable cover to one side of the keyboard assembly. The present invention is structure to allow a user to use the detachable keyboard assembly to replace a keyboard of the notebook computer. Before the replacement, the movable cover may be used to provide a function of dust and contamination protection for the keyboard assembly, and the positioning member may fix the movable cover to the keyboard assembly for easy carrying. And, to use, through the flexible bendable section, the movable cover is rotated, in a reversed direction, to one side of the keyboard assembly with the positioning member being further rotated to the underside of the movable cover to provide support, so that the movable cover may function as a support for wrist of a user. As such, the functionality of protection of the detachable keyboard is increased and easy replacement may be conducted when the keyboard is broken for reducing expenditure. In addition, the chance that a user may hurt the wrists for long-term use of the keyboard may be reduced.

With the above-described technology, the problems that the prior art notebook computer keyboards cannot feature ready detachment, easy cleaning and protection, and lacking ergonomics can be overcome and properly solved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-4, the drawings clearly show that the present invention comprises:

a keyboard assembly 1 that is selectively mounted to a notebook computer 6, the keyboard assembly 1 having one end to which at least one coupling section 11 is provided for coupling and fixing to the notebook computer 6;

a movable cover 2 that is movably mounted to one side of the keyboard assembly 1;

at least one flexible bendable section 3 that connects the keyboard assembly 1 and movable cover 2 to each other;

a positioning member 4 that is rotatably mounted to one side of the movable cover 2 that is distant from the flexible bendable section 3 for fixing the movable cover 2 to one side of the keyboard assembly 1, the positioning member 4 comprising a support section 41 rotatably mounted to the movable cover 2 and a limiting section 42 extending from one side of the support section 41 for being selectively retained to one side of the keyboard assembly 1 or being supported on one side of the notebook computer 6; and a pivot section 5 that is mounted to one side of the positioning member 4 and comprises a dual hinge arrangement to allow the positioning member 4 to rotate at one side of the movable cover 2.

The above description provides an explanation of the structure of the present invention and with components of the structure combined properly, a simple arrangement may be achieved for providing a keyboard protection cover and a wrist protection pad for the notebook computer 6, which will be described in more details in the following.

As shown in FIGS. 1-6A, with a structure constructed as above, it can be clearly seen from the drawings that the keyboard assembly 1 of the present invention comprises at least one coupling section 11 for selectively mounting to a notebook computer 6 in such a way as to be easily replaceable so that the keyboard assembly 1 that is mounted to the notebook computer 6 can be replaced individually when broken thereby helping lower down the necessary expenditure and in addition, a flexible bendable section 3 is included for connection with a movable cover 2, which allows a user to use in different ways so as to provide various additional functions to the keyboard assembly 1. Further, the movable cover 2 is directly coupled to the keyboard assembly 1 by the flexible bendable section 3 so that storage is easy and occupies no large amount of space and the issue of losing or leaving behind can be eliminated.

In practical use, coupling between the keyboard assembly 1 and the notebook computer 6 can be efficiently accomplished by means of the coupling section 11. The coupling can be one of slot fitting, snap fitting, tenon engagement, magnetic retention, and adhesive attachment. When not in use, the keyboard assembly 1 is protected against dust and contamination by having the movable cover 2 set on and covering a surface of the keyboard assembly 1. The positioning member 4 is rotated via the pivot section 5 to have the limiting section 42 of the positioning member 4 to fix a movable edge of the movable cover 2 to one side of the keyboard assembly 1 for preventing it from loosening during movement. To use, the movable cover 2 is rotated via the flexible bendable section 3 to have the surface thereof that is opposite to the keyboard assembly 1 rotated in a reversed direction and the positioning member 4 is rotated by an even larger range by means of the dual hinge structure of the pivot section 5 so that the support section 41 gets positioned against one side of the movable cover 2. The movable cover 2 may then be laid flat on one side of the keyboard assembly 1 with the limiting section 42 abutting one side of the notebook computer 6 to securely hold the movable cover 2 in position without undesired sliding or moving. A user may use such a structure as a wrist protection pad with the positioning member 4 firmly supporting the movable cover 2 at an angular position that is considered ergonomic to the user.

Figure 1:
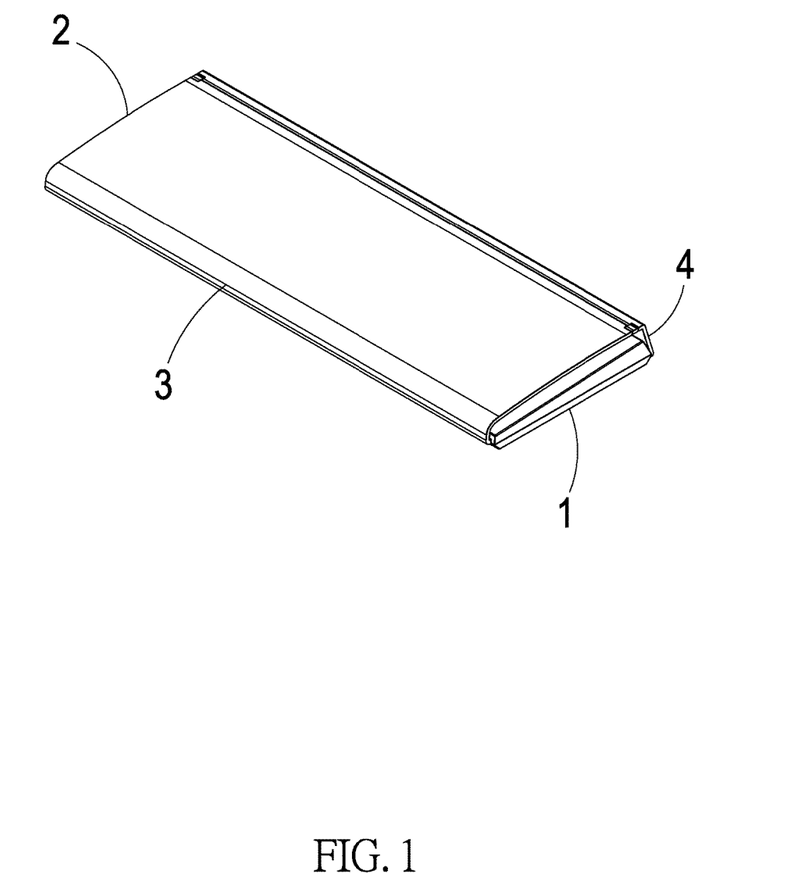
FIG. 1 is a perspective view illustrating a preferred embodiment of the present invention.
Figure 2:
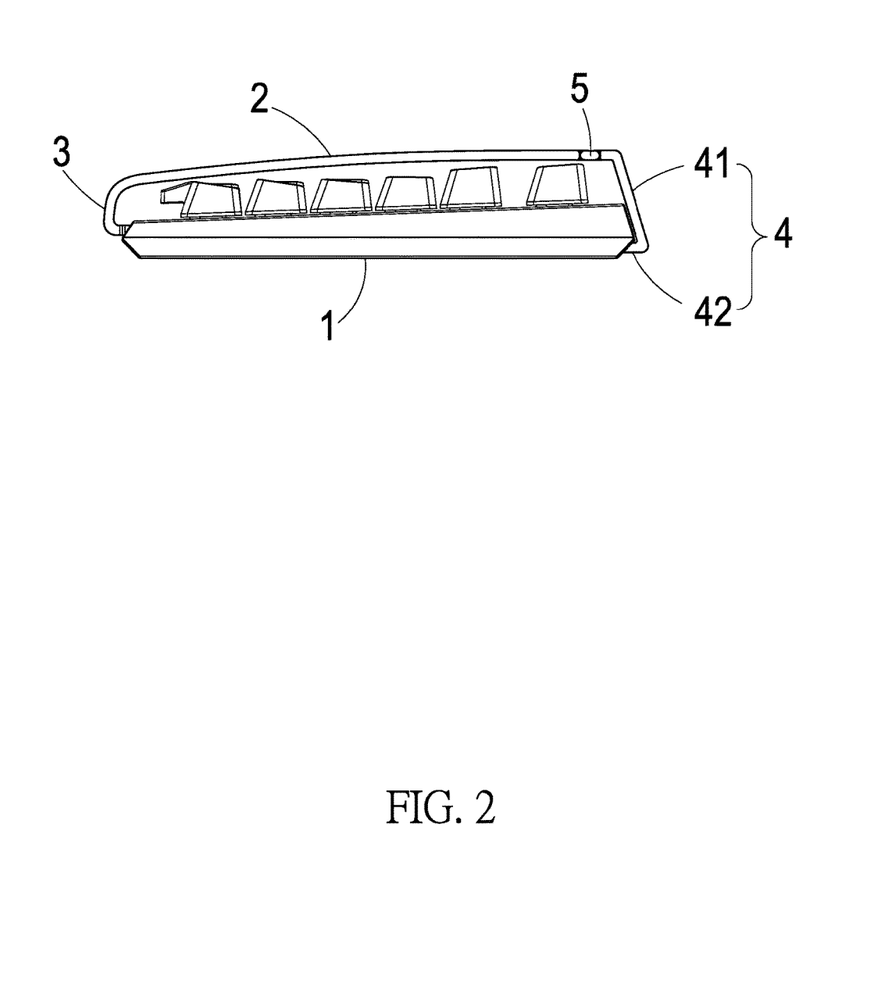
FIG. 2 is a side elevational view of the preferred embodiment of the present invention.
Figure 3:
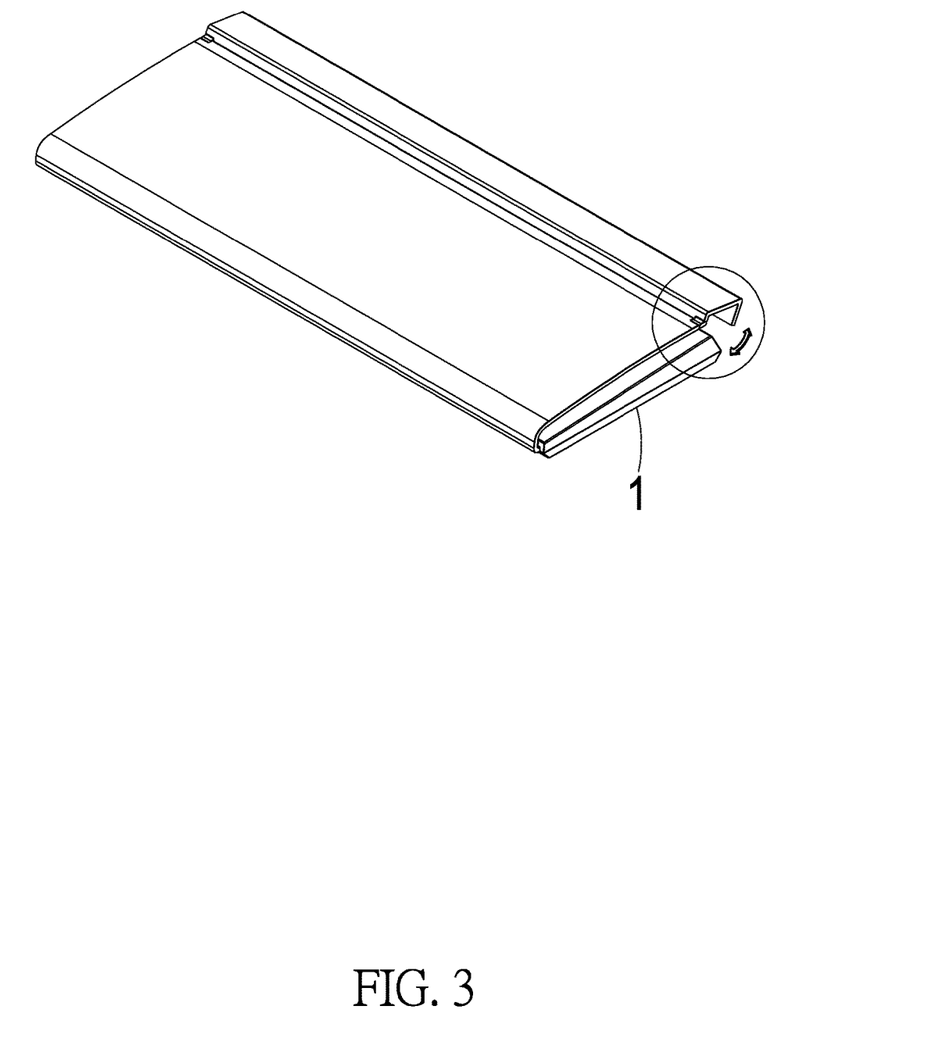
FIG. 3 is a schematic view demonstrating dust protection of the preferred embodiment of the present invention.
Figure 3A:
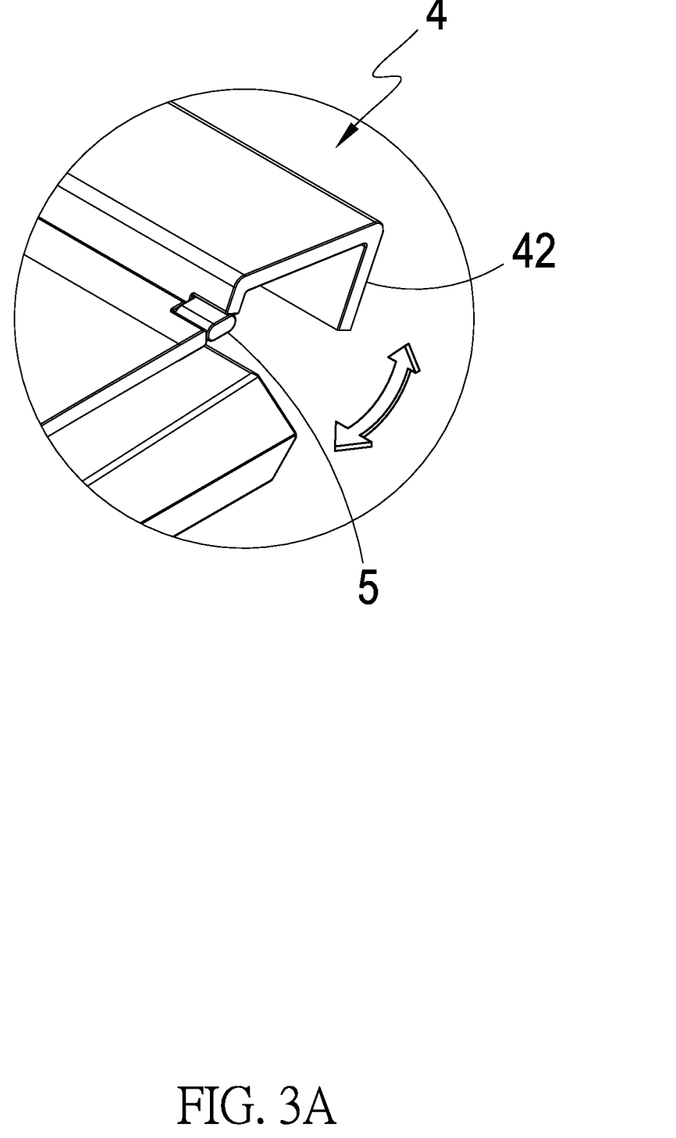
FIG. 3A is an enlarged view of a circled portion of FIG. 3.
Figure 4:
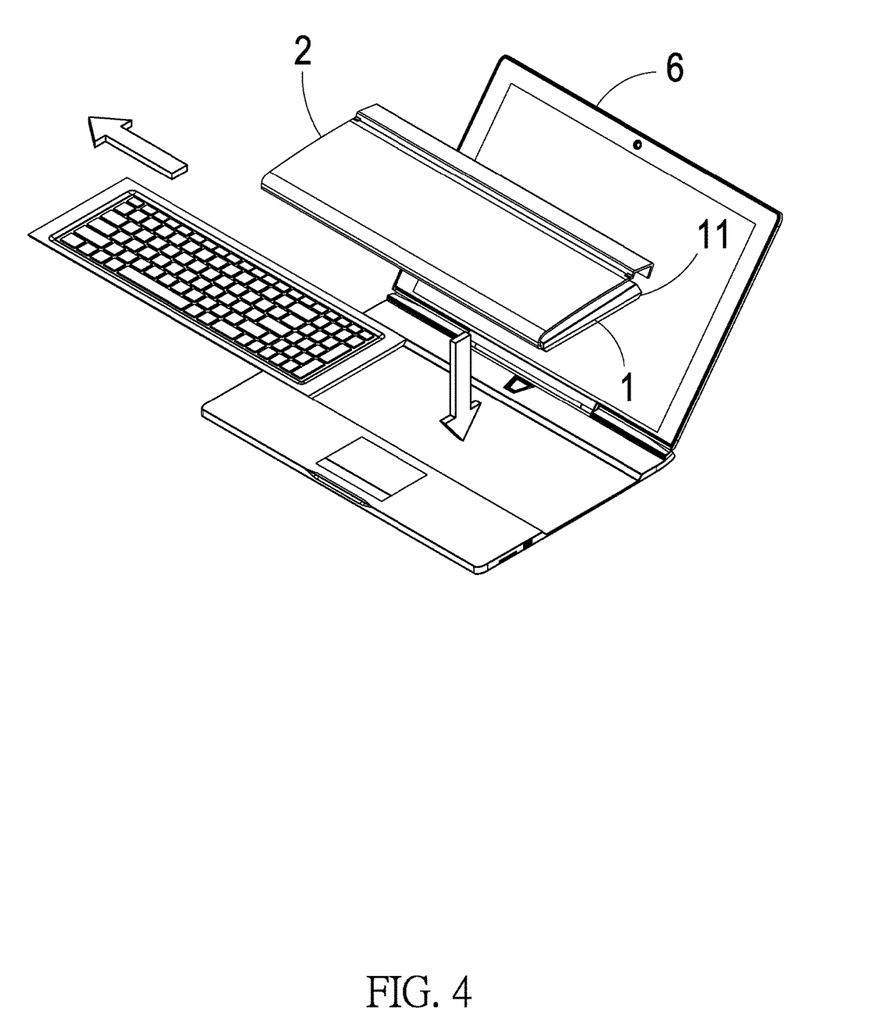
FIG. 4 is a schematic view illustrating the use of the preferred embodiment of the present invention.
Figure 5:
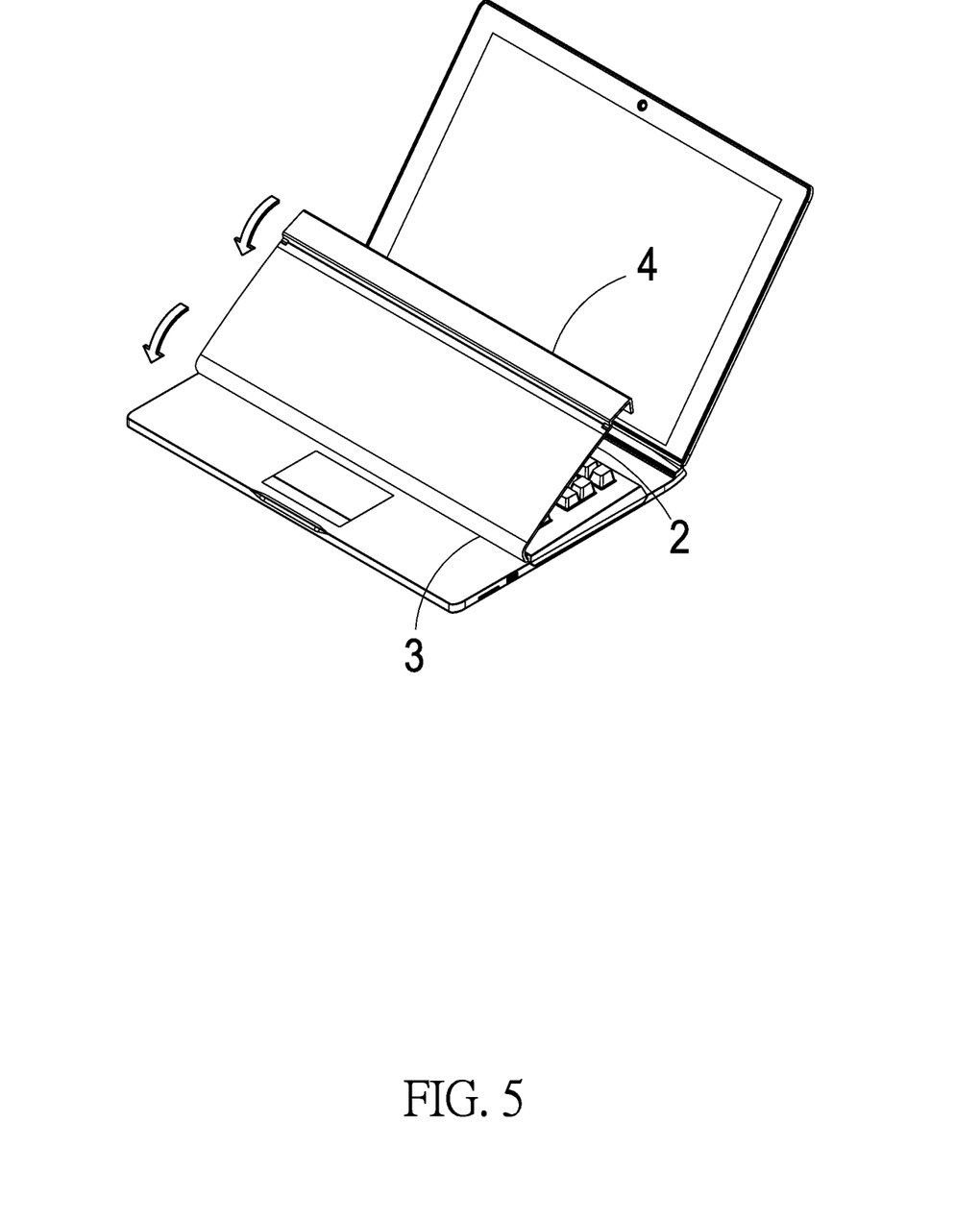
FIG. 5 is a schematic view illustrating the use of the wrist protection pad of the preferred embodiment of the present invention.
Figure 6:
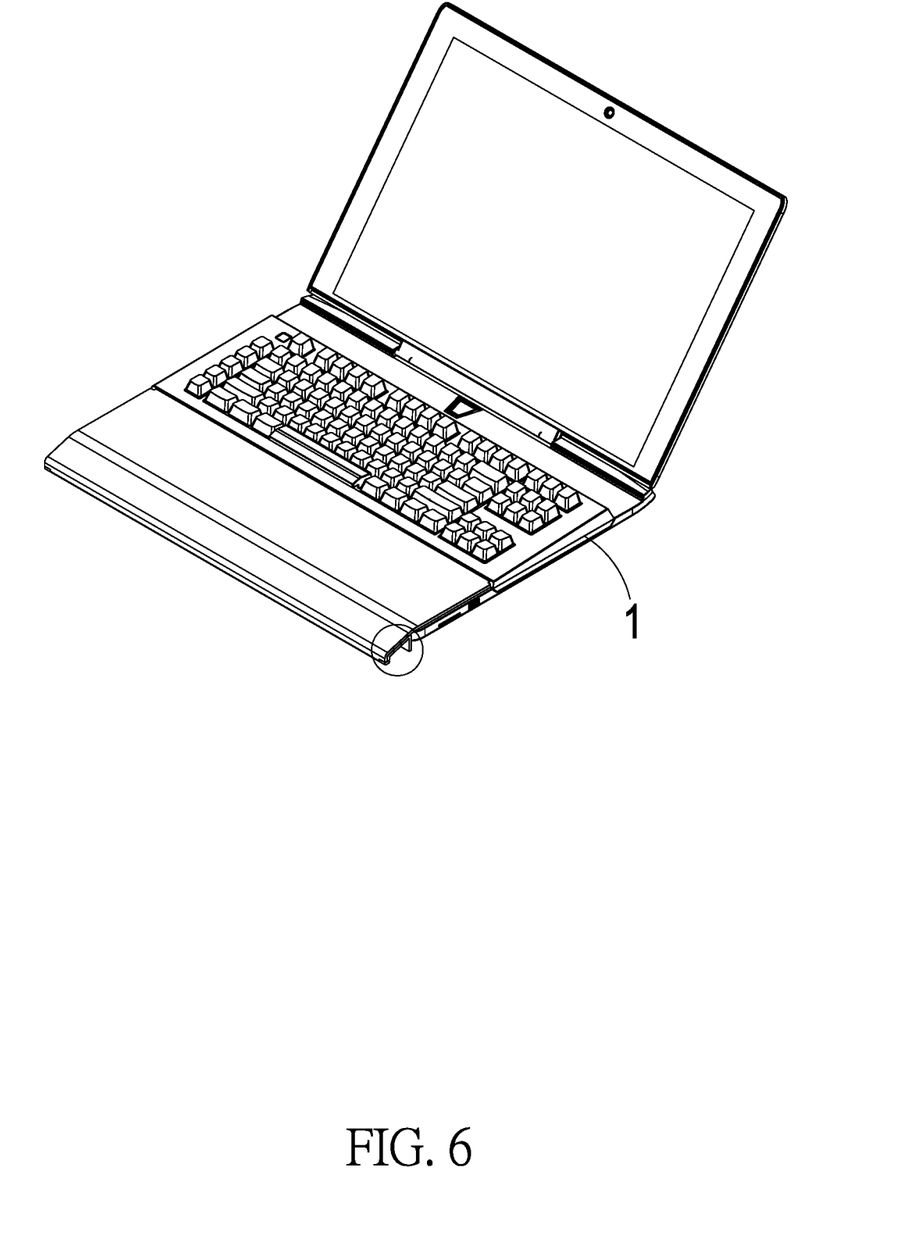
FIG. 6 is another schematic view illustrating the use of the wrist protection pad of the preferred embodiment of the present invention.
Figure 6A:
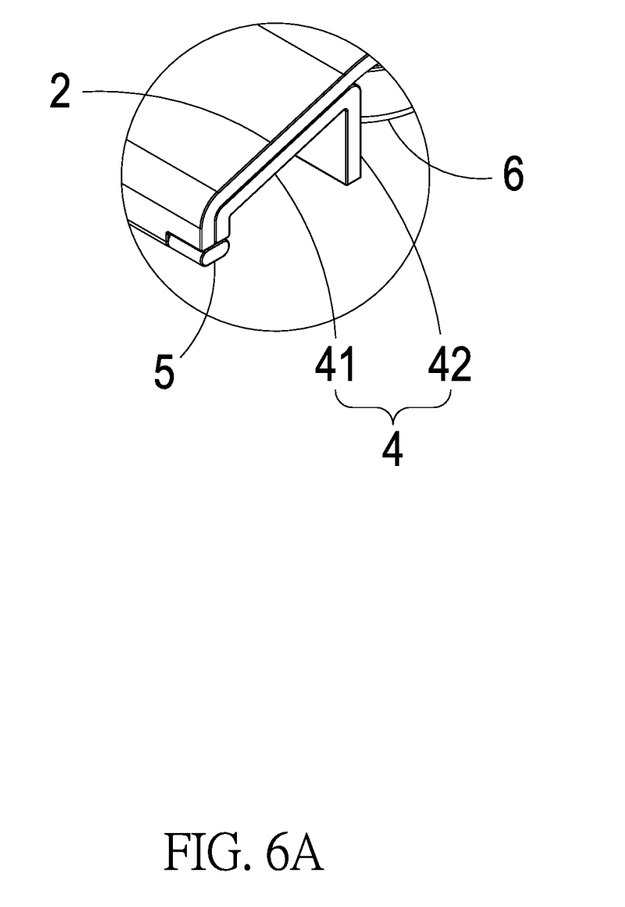
FIG. 6A is an enlarged view of a circled portion of FIG. 6.
Figure 7:
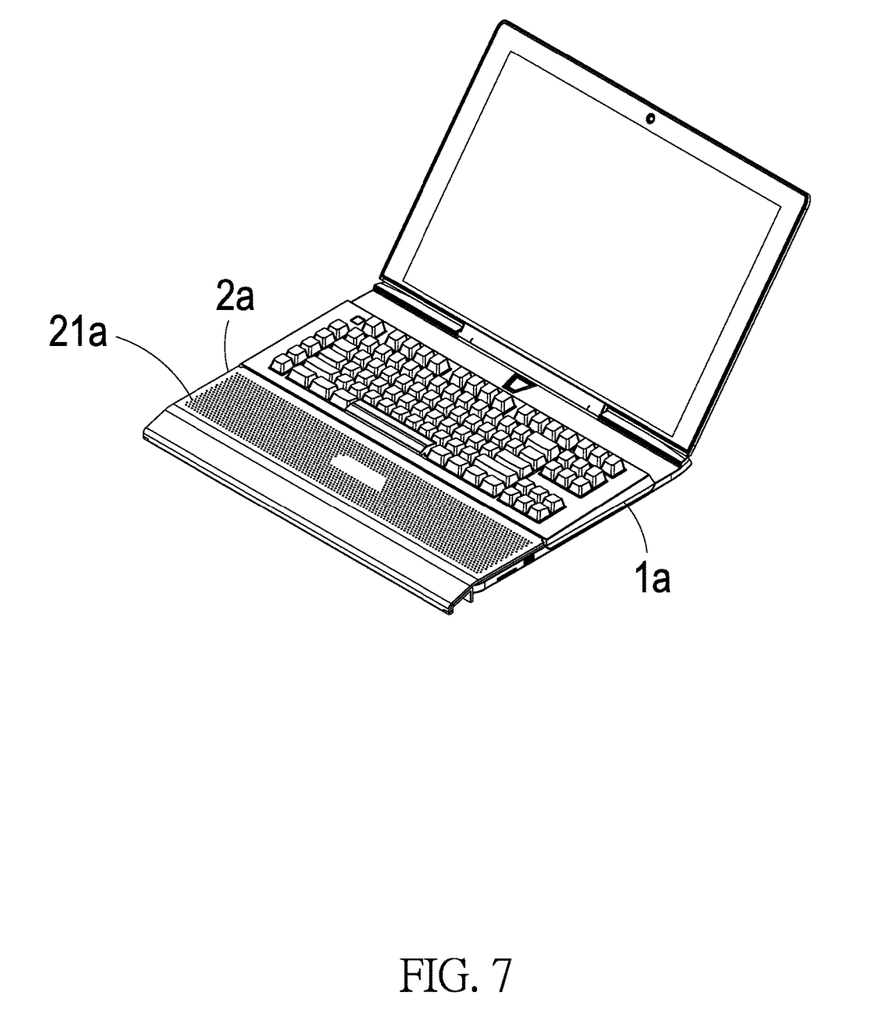
FIG. 7 is a schematic view illustrating the use of a wrist protection pad according to another embodiment of the present invention.

As shown in FIG. 7, it can be seen from the drawing that the instant embodiment is similar to the embodiment described above and the difference resides in that at least one protection cushion pad 21a is provided at one side of the movable cover 2a that is adjacent to the keyboard assembly 1a. The protection cushion pad 21a helps improve tactile perception of softness and conformableness when the movable cover 2a serves as a wrist protection pad and also prevent direct contact of the movable cover 2a that may be rigid and hard with the keyboard assembly 1a or the display screen when the movable cover 2a serves as a protection cover. Alternatively, the movable cover 2a may be made of a soft material to provide better performance and use.

Referring to all the drawings, the present invention, when compared with the prior art, provides the following advantages:

(1) The structure is simple; the operation is easy; and efficient and fast replacement of the keyboard assembly 1 can be achieved.

(2) Functions of dust and contamination protection and wrist protection can be alternatively achieved through rotation of the movable cover 2.

(3) Direct coupling to the keyboard assembly 1 is available for easy storage and carrying.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A detachable keyboard structure, comprising:
a keyboard assembly, which is adapted to be selectively mounted to a notebook computer such that a first edge of the keyboard assembly is adjacent to a display panel of the notebook computer and an opposite, second edge is distant from the display panel;
a movable cover, which has a proximal end that is movably mounted to the second edge of the keyboard assembly and a distal end distant from and opposite to the proximal end;
a flexible bendable section, which is arranged opposite to the display panel of the notebook computer with the keyboard assembly located between the flexible bendable section and the display panel of the notebook computer and is mounted to the proximal end of the movable cover and the second edge of the keyboard and connects the second edge of the keyboard assembly and the proximal end of the movable cover to each other such that the movable cover is movable relative to the keyboard assembly between a closed position where the distal end of the movable cover is releasably fixed to the first edge of the keyboard assembly and an open position where the distal end of the movable cover is distant from and substantially opposite to the first edge of the keyboard assembly; and a positioning member, which is rotatably mounted to the distal end of the movable cover that is distant from the proximal end of the movable cover to which the flexible bendable section is mounted for releasably fixing the distal end of the movable cover to the first edge of the keyboard assembly to set the moveable cover in the closed position;

wherein the positioning member is rotatably mounted to the distal end of the movable cover by a pivot section that is coupled to an inner side edge of the positioning member by a dual hinge arrangement to allow the positioning member to selectively move between a first condition and a second condition;

wherein the movable cover has a first surface that is adjacent to and faces and covers the keyboard assembly in the closed position and an opposite, second surface that is opposite to the first surface and faces away from the keyboard assembly in the closed position, wherein the first surface is moved away from the keyboard assembly to be distant from the display panel of the notebook computer and faces upward in the open position of the movable cover to define a top surface and the second surface faces downward and defines an undersurface of the movable cover in the open position;

wherein the positioning member comprises a support section that is rotatably mounted to the distal end of the movable cover by the pivot section such that in the first condition, the support member is releasably engageable with the first edge of the keyboard assembly to releasably fix the distal end of the movable cover to the first edge of the keyboard assembly to define the closed position of the movable cover and, in the second condition, the support member is positioned against the undersurface of the movable cover in the open position, to support and retain the movable cover in the open position.

2. The detachable keyboard structure according to claim 1, wherein the keyboard assembly has one end to which at least one coupling section is provided for coupling and fixing to the notebook computer.

3. The detachable keyboard structure according to claim 1, wherein the movable cover comprises at least one protection cushion pad mounted to the first surface of the movable cover and adjacent to the keyboard assembly such that the at least one protection cushion is exposed on the top surface of the movable cover in the open position.

4. The detachable keyboard structure according to claim 3, wherein the positioning member provides the protection cushion pad with a supporting force for the movable cover in the open position.

5. The detachable keyboard structure according to claim 3, wherein the positioning member comprises a limiting section extending from one side of the support section for being retained to one side of keyboard assembly.

6. The detachable keyboard structure according to claim 3, wherein the positioning member comprises a limiting section extending from one side of the support section for being supported on one side of the notebook computer.

7. The detachable keyboard structure according to claim 1, wherein the movable cover is made of a soft material.

* * * * *